United States Patent Office 2,773,056
Patented Dec. 4, 1956

2,773,056

STABLE FINELY DIVIDED ALKYL AMINE DYES

Bertram M. Helfaer, Hamburg, N. Y., assignor to Allied Chemical & Dye Corporation, New York, N. Y., a corporation of New York No Drawing. Application July 12, 1952,
Serial No. 298,625

3 Claims. (Cl. 260—208)

This invention relates to particulate organic base salts of organic dyestuff acids and to processes of producing same.

Salts of organic dyestuff acids with organic bases are a valuable class of colors which are insoluble or sparingly soluble in water but soluble in alcohol and useful for coloring lacquers, stains, varnishes and other vehicles. Such dyestuffs are disclosed, for example, in United States Patent 2,095,077, granted October 5, 1937. They are usually prepared by mixing an alkylamine with an organic dyestuff containing at least one acid or acid-salt group, such as —SO₃M or COOM— (M denotes hydrogen or metal) in an aqueous medium, and filtering, washing, drying, and pulverizing the resultant precipitated dyestuff. The pulverization is usually effected by grinding the dry dyestuff while cooling, for example, by addition of solid carbon dioxide, because the dyestuff tends to become sticky or semi-fluid when ground in the absence of such cooling.

Dyestuffs of this class at room temperature usually are amorphous, tacky and plastic solids of low but indefinite melting point. Notwithstanding the fact that they are substantially free of water and are not hygroscopic, particles of pulverized dyestuff when stored, even in closed containers, tend to agglomerate to form tough, hard masses which are difficult to remove from the container and require vigorous regrinding to reduce them to the powdered form required for dispersion or solution of the dyestuff in the vehicle to be colored therewith. This tendency of these dyestuffs to agglomerate in storage at atmospheric temperatures is objectionable.

Much research work has been devoted to the problem of improving the physical condition of such dyestuffs to eliminate or minimize their tendency to agglomerate when stored at room temperature. For example, the admixture with such dyestuffs of organic solids in finely divided form, such as betanaphthol, biphenyl, and dichlorobiphenyl, was found to increase the tendency of the dyestuff particles to agglomerate. The addition to such dyestuffs of well known anti-caking powders, such, for example, as finely divided hydrated calcium silicate (Silene) finely divided precipitated calcium carbonate (Calcene), and finely ground bentonite was found to have inadequate effect on the tendency of the dyestuff particles to agglomerate. Prior to this invention no satisfactory solution to this problem has been found. As marketed heretofore, the dyestuffs have been ground to a coarse condition, e. g. all retained on a 40 to 60 mesh screen and practically all passing through a 15 mesh screen in an effort to minimize agglomeration which inevitably occurred when smaller particles were produced.

It is an object of this invention to provide such organic amine dyestuffs in a particulate form which has little or no tendency to agglomerate in storage at atmospheric temperatures, even though the particle size be much smaller than was heretofore generally employed.

Another object is to provide a process for producing such particulate dyestuffs which remain in a free-flowing condition when stored at atmospheric temperatures.

The expression "particulate" is used herein to include powders, grains, flakes, etc. forms of the pigment.

Other objects and advantages of this invention will be apparent from the following detailed description thereof.

In accordance with this invention such organic amine dyestuffs are admixed with activated silica gel having the physical properties hereinbelow noted, desirably in the proportions of 1 to 25, preferably 5 to 15, parts of activated silica gel per 100 parts by weight of organic amine dyestuff. Even a greater amount of activated silica gel could be used, if desired, but would be wasteful, and would tend to reduce the tinctorial value of the dyestuff. Surprisingly, it has been found the addition of the activated silica gel to such dyestuffs in the proportions above noted results in a mixture which remains stable in storage, and retains its free-flowing characteristics.

The activated silica gel employed in accordance with this invention should have the following physical characteristics:

1. A surface area of at least 100, preferably from 180 to 900 square meters per gram.
2. An oil absorption value of at least 100 and preferably from 150 to 180.
3. An average particle size of from 0.01 to 50 microns, preferably from 0.02 to 20 microns.

The activated silica gel contains chemically combined water, the amount varying, and depending upon the process employed in producing and activating the silica gel. In general, the water content is within the range of from about 2% to about 10% by weight of the gel.

By an activated silica gel is meant a silica gel which is partially dehydrated under controlled conditions to produce a silica gel having the physical properties above enumerated. As procedures for effecting activation of silica gels are well known, it is believed further description thereof is unnecessary, except to add that the activation procedure should be carried out to provide a silica gel product having the physical properties above noted.

A preferred activated silica gel which may be used in this invention is the product sold under the trade name "Syloid 308," which has a particle size averaging from 6 to 9 microns, an oil absorption value of about 170 and a surface area of about 180 to 350 square meters per gram. Where reference is made to the size of the particles in microns, unless otherwise indicated, the reference is to the longest dimension of the particle.

The activated silica gel product sold under the trade name "Hi-Sil" may also be used. This product has an average particle size of 0.025 microns, a moisture content of 4% to 7%, an oil absorption value of 160, a surface area within the range above noted, and the following analysis:

| | |
|---|---|
| $SiO_2$ | 86.5% |
| CaO | 3.0% |
| NaCl | 2.0% max. |
| $Fe_2O_3$ | 0.3% max. |
| $Al_2O_3$ | 0.3% max. |

The dyestuffs which are stabilized and rendered free-flowing in particulate form in accordance with this invention are formed from an organic dyestuff containing an acid or acid-salt group, such as —COOM or —SO₂OM, in which M represents hydrogen or metal, and from an aliphatic amine having the following general formula:

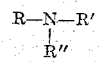

in which R and R' are each an alkyl radical containing from 4 to 20 carbon atoms and R" is hydrogen or an alkyl radical containing from 4 to 20 carbon atoms. The expression "acid radical" is used in the claims to include both the acid and the corresponding acid-salt group.

The amine salt of a mono-acid dyestuff may be represented by the following probable general formula:

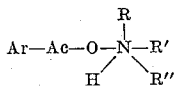

wherein Ar represents the dyestuff nucleus, Ac represents a —CO— or —SO$_2$— group joined directly to an aromatic carbon of the dyestuff, R and R' each denotes an alkyl radical containing from 4 to 20 carbon atoms, and R" denotes hydrogen or an alkyl radical containing from 4 to 20 carbon atoms. In case the dyestuff contains two or more acid or acid-salt groups, then the resulting alkyl amine salt is regarded as containing the same or a corresponding number of said groups each in combination with one alkyl amine group and may be represented by the general formula:

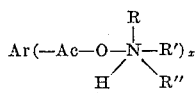

wherein Ar, Ac, R, R' and R" have the values previously ascribed and $x$ represents an integer equal to the number of acid or acid-salt groups of the parent dyestuff.

The alkylamine dyestuffs thus produced are soluble in various organic solvents, particularly ethyl alcohol, and are insoluble or only sparingly soluble in water.

The activated silica gel may be incorporated in the alkyl amine organic acid dye at any time during the manufacture of the dye after separation of the dye from the aqueous layer usually formed when reacting the organic acid dye in an aqueous medium with the alkyl amine. Thus, the silica gel may be mixed with the dry dyestuff powder. However, to avoid duplication of operations, particularly the grinding operation, it is preferred to incorporate the silica gel in the alkyl amine organic acid dye just prior to subjecting the dye to grinding to produce the dry dyestuff powder. Surprisingly, it has been found that employing this invention, the dye activated silica gel mixture may be ground to any desired size and the particles stored at atmospheric temperature without agglomerating. The particles, for example, can be produced so fine that 100% will pass through a 60 mesh screen and will not agglomerate during storage at atmospheric temperature.

While the explanation for the property of the activated silica gel to impart stability and free-flowing characteristics to alkyl amine salts of organic dyestuff acids is not fully known, it is believed one possible explanation is that the dyestuff is in metastable form between an amorphous and a crystalline condition. The added activated silica gel particles form foci for the crystallization of the dye, and therefore tend to cause the dye to attain chiefly a crystalline form, thus minimizing the tendency of the dye to change its condition to the amorphous with consequent formation of hard large lumps. Another possible explanation is that the dye is in the form of molecules having unsatisfied hydrogen bonds. The activated silica gel tends to react with these unsatisfied hydrogen bonds which would otherwise be satisfied by combining with similar bonds of other dye molecules, thus preventing coalescing of the dye molecules, which coalescence would result in the production of hard large lumps. It will be understood that this invention is not to be limited to the above possible explanations of its effectiveness and that a combination of both explanations hereinabove given may be responsible for the stability and free-flowing characteristics of alkyl amine organic acid dyes embodying this invention.

The following examples are given for purposes of illustration only. It will be understood that this invention is not limited to these examples. In these examples all parts are by weight. The activated silica gel used is Syloid 408, unless otherwise indicated. In all examples the dye particles were maintained at atmospheric temperatures (about 25° C.) during storage.

*Example I*

A mixture of 74 parts (0.3 mol) of di(2-ethylhexyl) amine and 28 parts of glacial acetic acid was stirred into a warm (45° C.) solution of 100 parts of the monoazo dyestuff obtained by coupling diazotized aniline with 1-p-sulphonphenyl-3-methyl-5-pyrazolone (Fast Wool Yellow 3 GL, Color Index 636) containing 0.22 mol of organic dyestuff in about 700 parts of water. Approximately one hour was required for the addition of the alkyl amine to the organic acid dyestuff. The resulting mixture was then heated to 85°–90° C. for an hour. 29 parts of 20° Bé. hydrochloric acid were added. The mixture was agitated at 85°–90° C. for one hour and then allowed to settle, to cause separation of an upper aqueous layer and a lower layer of the tarry dye. The dye layer (125 parts) was withdrawn and mixed in a mortar with 32 parts of activated silica gel during which the mixture set up into a solid which was ground. The resulting product was dried at 50°–55° C. and then ground to a fine powder.

This powder was examined after storage in closed containers for about eight months and was found to be free-flowing and contained no lumps.

A similar dye powder produced in the same manner, but without the presence of the activated silica gel formed a solid mass after about 1 to 3 months storage under the same conditions.

*Example II*

100 parts of a mixture of the sodium salts of copper phthalocyanine mono- and di-sulfonic acids containing about 0.25 mol of organic dyestuff were dissolved in 1800 parts of water at 80° C., and the solution was made neutral to Nitrazine Yellow paper with glacial acetic acid. A mixture of 75 parts (0.31 mol) of di(2-ethylhexyl) amine and 27 parts of glacial acetic acid was added during one hour at 80°–85° C. to completely precipitate the color from solution. The resulting mixture was heated to 94°–98° C. for one hour and then allowed to settle to form an upper aqueous layer and a lower layer of the tarry dye. The dye layer was withdrawn, mixed with activated silica gel in the proportion of 1 part of silica gel per 9 parts of dye by weight, the mixture ground, dried at 50°–55° C., and then reground to a fine powder.

The dye powder thus obtained was free-flowing and devoid of lumps when inspected after storage for seven months in closed containers.

Dye powder prepared in the same manner, but without the activated silica gel, set up to a hard mass within a week.

In a similar manner dye powders containing activated silica gel were prepared as described in Examples III–VII. These dye powders remained free-flowing and devoid of lumps when examined after about eight months of storage at atmospheric temperature, whereas the powders omitting silica gel formed hard masses within a month.

*Example III*

Di(2-ethylhexyl) amine (0.415 mol) was reacted with an azodyestuff mixture obtained by combining one molecular proportion of 1,8-dihydroxy naphthalene-3,6-disulfonic acid (C-acid) with one molecular proportion of a mixture of diazotized o-anisidine and o-aminoazoanisole (0.207 mol). The resultant mixture was worked up as hereinabove described in Examples I and II, i. e., the tarry dye layer was separated from the aqueous layer, mixed with approximately 15% of its weight of activated silica gel; the mixture ground, dried, and then finely ground to a fine powder.

This fine powder was found to be stable in storage, i. e., it had no tendency to agglomerate or form hard lumps.

*Example IV*

Di(2-ethylhexyl) amine (0.585 mol) was reacted with a disazodyestuff obtained by coupling diazotized aminoazobenzene into 2-hydroxy naphthalene-6,8-disulfonic acid (Crocein Scarlet, Color Index 252), 0.286 mol of the organic dyestuff acid being used.

The resultant reaction mixture was worked up as described in the preceding examples, except that approximately 5% by weight of activated silica gel (Hi-Sil) was incorporated with the dye.

The resultant fine powder was found to be stable in storage at atmospheric temperature.

*Example V*

Di(2-ethylhexyl) amine (0.672 mol) was reacted with a monoazodyestuff obtained by coupling diazotized sulfanilic acid into b-naphthol (Wool Orange A, Color Index 151), 0.543 mol of the organic acid dyestuff being used. The resultant reaction mixture was worked up in the same manner as in the preceding Examples I and II except that approximately 5% of activated silica gel (Hi-Sil) was admixed with the dye.

The fine powder produced upon grinding the dry mixture was stable in storage.

*Example VI*

Di(2-ethylhexyl) amine (0.527 mol) was reacted with a disodium salt of 1-amino-4-(4'-toluidino) anthraquinone-2,2'-disulfonic acid, 0.246 mol of the disodium salt being used. The resultant reaction mixture was worked up in the same manner as in the preceding examples, and the isolated dye combined with approximately 8% of its weight of activated silica gel (Hi-Sil).

The ground dry product thus produced was found to remain in a free-flowing stable condition.

*Example VII*

Di(2-ethylhexyl) amine (0.365 mol) was reacted with a disazodyestuff (0.085 mol) obtained by combining 1-amino-8-hydroxynaphthalene-3,6-disulfonic acid (H-acid) with diazo p-nitraniline (acid) and diazo metanilic acid (alkaline). The resultant dye was isolated from the reaction mixture following the procedure outline in Examples I and II, mixed with approximately 10% of its weight of activated silica gel; the mixture ground, dried, and the dried mixture reground.

The resulting fine dye particles remained free-flowing and stable in storage.

It will be noted that this invention provides a dye of the alkyl amine organic acid type which remains free-flowing and stable in storage at atmospheric temperatures, which can be produced in a much finer particle size, for example, so fine that it will pass through a 60 mesh screen and notwithstanding its smaller particle size will not agglomerate during storage at atmospheric temperatures.

It is to be understood that this invention is not restricted to the present disclosure otherwise than as defined by the appended claims.

What is claimed is:

1. A dry free-flowing particulate dyestuff consisting of an organic amine non-hygroscopic salt having the following formula:

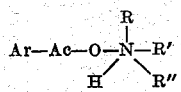

in which Ar is the dyestuff nucleus, Ac is from the group consisting of —CO—, and —SO$_2$—, and is joined directly to an aromatic carbon of the dyestuff, R and R' are each an alkyl radical containing from 4 to 20 carbon atoms, and R" is from the group consisting of hydrogen and an alkyl radical containing from 4 to 20 carbon atoms admixed with 1 to 25 parts per 100 parts by weight of said salt, of activated silica gel having a surface area of at least 100 square meters per gram, an oil absorption value of at least 100, and having an average particle size of from 0.01 to 50 microns.

2. A dry free-flowing particulate dyestuff consisting of an organic amine non-hygroscopic salt having the following formula:

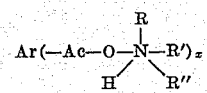

in which Ar is the dyestuff nucleus, Ac is from the group consisting of —CO—, and —SO$_2$—, and is joined directly to an aromatic carbon of the dyestuff, R and R' are each an alkyl radical containing from 4 to 20 carbon atoms, R" is from the group consisting of hydrogen and an alkyl radical containing from 4 to 20 carbon atoms, and $x$ is an integer equal to the number of acid groups in the dyestuff nucleus; said salt being admixed with 1 to 25 parts per 100 parts by weight of said salt, of activated silica gel having a surface area of at least 100 square meters per gram, an oil absorption value of at least 100, and having an average particle size of from 0.01 to 50 microns.

3. A dry particulate dyestuff consisting of an organic amine non-hygroscopic salt having the following formula

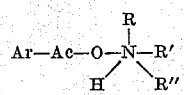

in which Ar is the dyestuff nucleus, Ac is from the group consisting of —CO— and —SO$_2$— and is joined directly to an aromatic carbon of the dyestuff, R and R' are each an ethylhexyl radical and R" is from the group consisting of hydrogen and ethylhexyl, admixed with 1 to 25 parts per 100 parts by weight of said salt, of activated silica gel having a surface area of at least 100 square meters per gram, an oil absorption value of at least 100, and having an average particle size of from 0.01 to 50 microns.

References Cited in the file of this patent

UNITED STATES PATENTS

| | | |
|---|---|---|
| 2,095,077 | Payne | Oct. 5, 1937 |
| 2,257,545 | Curtis | Sept. 30, 1941 |
| 2,267,867 | Kienle | Dec. 30, 1941 |
| 2,555,603 | Ogilvie | June 5, 1951 |
| 2,588,853 | Kumins | May 11, 1952 |
| 2,625,492 | Young | Jan. 13, 1953 |

FOREIGN PATENTS

| | | |
|---|---|---|
| 101,724 | Australia | Aug. 12, 1937 |

OTHER REFERENCES

The Chem. Trade Jour. & Chem. Engin., Jan. 19, 1940, page 34, article on "Silica Gel."